United States Patent [19]

Hasegawa et al.

[11] Patent Number: 5,159,524

[45] Date of Patent: Oct. 27, 1992

[54] LASER TRIMABLE CAPACITOR

[75] Inventors: Yo Hasegawa, Nara; Kazuyuki Okano, Ikoma; Yasuhito Isozaki, Neyagawa; Chiharu Hayashi, Hirakata; Tatsuo Ogawa, Kobe, all of Japan

[73] Assignee: Matsushita Electric Industrial Co., Ltd., Osaka, Japan

[21] Appl. No.: 567,421

[22] Filed: Aug. 14, 1990

[30] Foreign Application Priority Data

Aug. 16, 1989 [JP] Japan .................. 1-210884
Jul. 30, 1990 [JP] Japan .................. 2-202087

[51] Int. Cl.⁵ ............... H01L 27/00; H01C 10/00; H01G 4/10
[52] U.S. Cl. ................... 361/271; 338/195; 361/321

[58] Field of Search .......... 338/308, 309, 20; 29/25.41, 25.42; 361/301, 304, 271, 277, 320, 321; 174/68.5

[56] References Cited

U.S. PATENT DOCUMENTS

| 3,827,142 | 8/1974 | Bennett et al. | 29/620 |
| 4,190,854 | 2/1980 | Redfern | 361/271 X |
| 4,301,439 | 11/1981 | Johnson et al. | 338/308 X |
| 4,650,923 | 3/1987 | Nishigaki et al. | 174/68.5 |
| 4,792,779 | 12/1988 | Pond et al. | 338/195 |

Primary Examiner—Donald A. Griffin
Attorney, Agent, or Firm—Panitch Schwarze Jacobs & Nadel

[57] ABSTRACT

A capacitor which includes a dielectric layer, a metal electrode and a capacity adjusting electrode erodable by exposure to light energy, the capacity adjusting electrode being a film made of at least one selected from metallic oxides, metallic nitride and metallic boride.

9 Claims, 5 Drawing Sheets

LASER TRIMABLE CAPACITOR

BACKGROUND OF THE INVENTION

1. Field of the Invention

The present invention relates generally to the adjustment of circuit constants in various electronic apparatus, and more particularly to a capacitor used for adjusting circuit constants in various electronic apparatus.

2. Description of the Prior Art

The common practice to adjust variations in capacity of the circuits of electronic apparatus is to employ trimming capacitors that are manually or mechanically operable. This method is not applicable when the electronic apparatus is small-sized and lightweight, because of the difficulty in reducing the size of trimming capacitors. In addition, the known trimming capacitors are costly, and when they are incorporated in an automated line, the cost as a whole increases. Furthermore, the known trimming capacitors are liable to detrimental errors in capacity due to mechanical vibrations.

There is another proposal for adjusting capacity in the circuits, in which electrodes of metal films or sheets are mechanically or optically adjusted to remove discrepancies in the capacity in the circuits. This method is disadvantageous in that the electrodes are liable to variation in the capacity owing to mechanical or thermal stresses after they are mechanically or thermally adjusted. In addition, the electrodes of metal films or sheets are expensive.

SUMMARY OF THE INVENTION

The capacitor of the present invention, which overcomes the above-discusssed and numerous other disadvantages and deficiencies of the prior art, comprising a dielectric layer, a first electrode and a second electrode with the dielectric layer interposed therebetween, the second electrode comprising a metal electrode and a capacity adjusting electrode electrically connected to the metal electrode, the capacity adjusting electrode being erodable by exposure to light energy, the capacity adjusting electrode being a film made of at least one selected from metallic oxides, metallic nitride and metallic boride.

According to another aspect of the present invention, the capacitor comprises a substrate, a first electrode overlaid on the substrate, a dielectric layer formed on the first electrode, a second electrode overlaid on the dielectric, the second electrode comprising a metal electrode and a capacity adjusting electrode electrically connected to the metal electrode, the capacity adjusting electrode being erodable by exposure to light energy, the capacity adjusting electrode being a film made of at least one selected from metallic oxides, metallic nitride and metallic boride.

In a preferred embodiment, the first electrode on the substrate is arranged without any relative positional relationship with the metal electrode.

According to another aspect of the present invention, the capacitor includes a substrate, a first electrode overlaid on the substrate, a dielectric layer formed on the first electrode, a capacity adjusting electrode overlaid on the dielectric, the capacity adjusting electrode being erodable by exposure to light energy, the capacity adjusting electrode being a film made of at least one selected from metallic oxides, metallic nitride and metallic boride.

According to a further aspect of the present invention, the capacitor comprises a dielectric layer, a first electrode and a second electrode with the dielectric layer interposed therebetween, the second electrode comprising a metal electrode having no relative positional relationship with the first electrode, and a capacity adjusting electrode electrically connected to the metal electrode and having a relative positional relationship thereto, the capacity adjusting electrode being erodable by exposure to light energy, the capacity adjusting electrode being a film made of at least one selected from metallic oxides, metallic nitride and metallic boride.

In a preferred embodiment, the capacitor further comprises a protective layer covering at least the second electrode.

In a further preferred embodiment, the metallic oxide is ruthenium oxide and its derivative.

In a preferred embodiment, the capacitor is wholly or partly covered with a protective layer.

Thus, the invention described herein makes possible the objects of (1) providing a capacitor capable of economical production, and being small-sized, lightweight and reliable, and (2) providing a capacitor capable of easy capacity adjustment.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENT

Referring to FIGS. 1 to 5, the present invention will be described by way of example which is embodied as a chip type variable capacitor:

Example (1)

Figure 1:
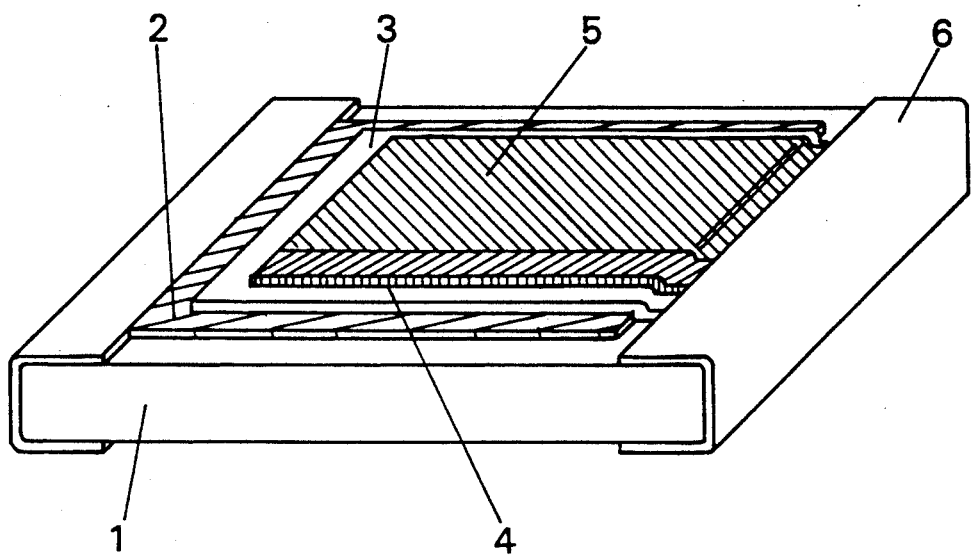
FIG. 1 is a perspective view showing a capacitor according to the present invention.
Figure 2:
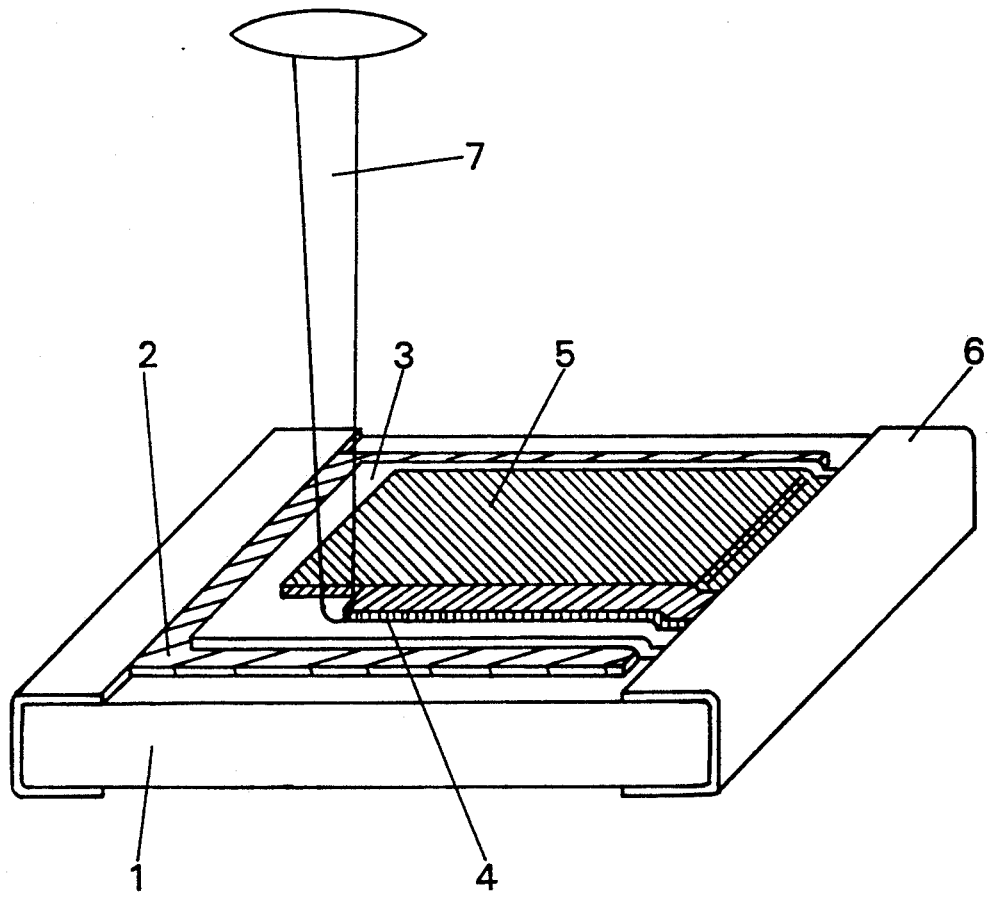
FIG. 2 is an explanatory view exemplifying the principle underlying the present invention.

Referring to FIG. 1, an electrode 2 is placed on an insulating substrate 1, and a dielectric member 3 is kept in contact with the electrode 2. A capacity adjusting electrode 4 (hereinafter called "adjusting electrode") and a metal electrode 5 are respectively overlaid on the dielectric member 3, of which the adjusting electrode 4 is designed to adjust the capacity. The electrode 5 and the terminal 6 are individually made because of the different thicknesses required for the electrode 5 and the terminal 6; more specifically, the electrode 5 can be relatively thin whereas the terminal 6 can be relatively thick enough to withstand the soldering load. However, it is possible to extend the electrode 5 outside and use the extended portion as a terminal 6.

The dielectric substrate 1 is made of a known substance such as ceramic plate (e.g. alumina, zirconium, aluminum nitride), single crystal plate (e.g. sapphire, quartz) glass plate, thermoplastic or thermosetting plastic. From an economical point of view, alumina, glass plate or various synthetic resin plates can be advantageously used.

The metal electrode 5 can be made by sintering metal foil or paste such as nickel, copper, gold or silver. Alternatively, it can be made by metal deposition or sputtering.

The dielectric member 3 can be made of various known substances, but when the capacitor is a variable capacity type, the minimum change of capacity is desired so that a substance having a small dielectric constant is used; for example, synthetic resins (e.g. fluorine resin, polyolefin resin), ceramic thin films or sintered film (e.g. alumina, titanium, barium oxides). When a capacitor having a large electric capacity is required, a substance having high dielectric constant such as barium titanate may be used. They are overlaid to the electrode 2 by fusion, sintering, vaporizing or any other known method.

The capacity adjusting electrode 4 is made of a substance having high conductivity, and is easily removable, such as metallic oxide film, metallic nitride film, metallic boride film. These films easily absorb visible light and near-infrared rays, so that they can be eroded by exposing them to a laser beam or a halogen lamp light without irradiating them with high energy light.

Figure 3:
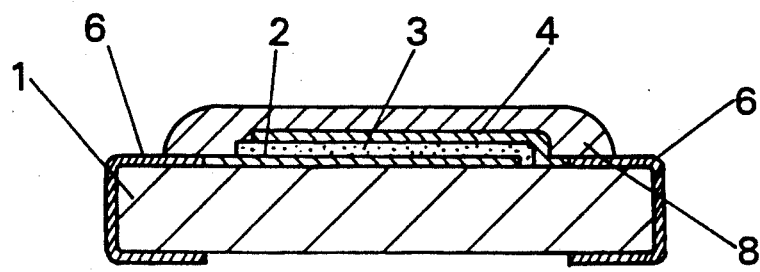
FIG. 3 is a cross-sectional view through the capacitor including a protective film.

The adjusting electrode 4 made of such metal films have another advantage as follows:

FIG. 3 shows that a capacitor of the shape shown in FIG. 1 is built in a circuit substrate or hybrid integrated circuit and covered with a protective layer 8 of glass, and they are irradiated with a laser beam through the protective layer 8 so as to remove the adjusting electrode 4. The protective layer 8 protects the circuit element against detrimental effects which otherwise would be inflicted by the exposure to the laser beam.

The adjusting electrode 4 can be formed by vaporizing or sputtering or any known method. However, owning to the fact that it is required to form the adjusting electrode 4 in a pattern, a metallo organic deposition method is preferred, which thermally decomposes the patterns printed with an organic compound solution containing metal resinate or the like. It is of course possible to make patterns on a film formed by an etching or a pattern masking method.

The adjusting electrodes can be made of various metallic organic compounds and a binder, but when the cost, the easiness to form a pattern, and electrical conductivity are taken into consideration, ruthenium oxide or its derivatives such as ruthenate bismuth, ruthenate lead, ruthenate barium, a solid solution of ruthenium oxide-titanium oxide can be used.

The adjusting electrode 4 made of a thin film of these substances can be eroded quickly by exposure to light energy such as laser, thereby speeding up the adjustment of electric circuits.

The metal electrode 5 is made of metals in common use for making ordinary electrodes, such as gold, silver, copper, nickel, aluminum or their alloys. A film of these metals is formed on the dielectric layer 3 in a known method such as by vaporizing, sputtering, or plating.

The adjusting electrode 4 and the metal electrode 5 are electrically connected to each other, preferably along their edges as shown in FIG. 1. The arrangement of the adjusting electrode 4 as shown in FIG. 1 is advantageous in that series resistance to the capacitor is minimized and the high frequency characteristics are maintained.

Figure 4:
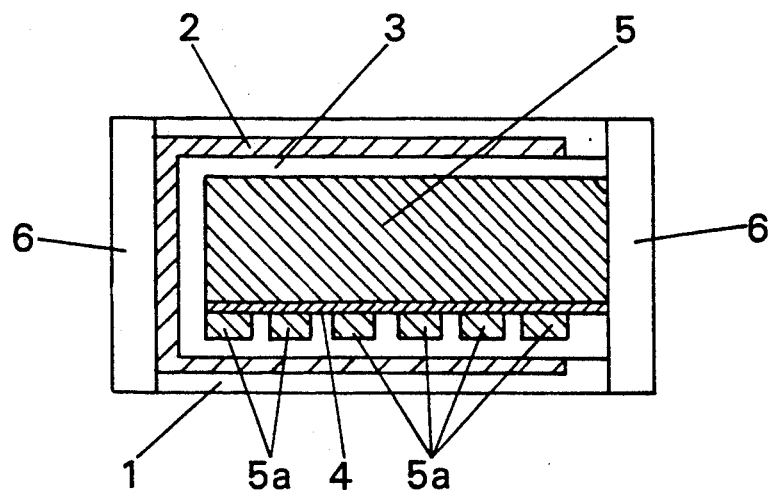
FIG. 4 is a plan view showing a positional relationship between a metal electrode and a capacity adjusting electrode.

FIG. 4 shows a modified version constructed as follows:

A large metal electrode 5 is disposed on a dielectric layer 3, and a strip-shaped adjusting electrode 4 is joined to one edge of the metal electrode 5. In addition, small pieces of metal electrodes 5a are attached in series to the outside of the strip-shaped adjusting electrode 4 wherein the large and small metal electrodes are electrically connected to each other through the adjusting electrode 4. In this arrangement, if the capacity is made variable, the adjusting electrode 4 will be eroded by irradiating the capacitor with light. The reduced area of the adjusting electrode 4 is advantageous in that series resistance of the capacitor is minimized and variations of high frequency characteristics, if any, are negligible.

Figure 5:
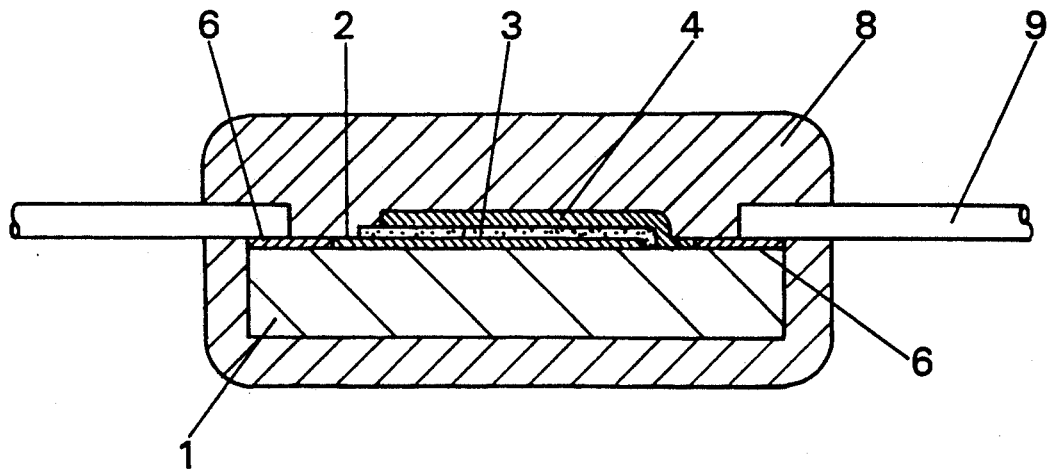
FIG. 5 is a sectional view exemplifying the protection of capacitors according to the present invention.

FIGS. 3 and 5 show further modified versions in which the capacitor is wholly or partly covered with a protective layer 8. As described above, the protective layer 8 is made of synthetic resin (thermoplastic or thermosetting resin) or glass. The protective layer 8 enhances the reliability of the capacitor.

The illustrated example is a chip type variable capacitor and on the basis of it the method of adjusting the circuit constant in electronic apparatus has been described. However, the present invention is not limited to this type of capacitor. For example, the capacitor according to the present invention is formed by printing on a circuit substrate or a hybrid integrated circuit, and on the basis of it, the adjusting method can be carried out.

FIG. 5 shows a further modification in which leads 9 are taken out of a chip-type terminal 6. This example shows that the capacitor with leads is also obtainable.

Figure 6:
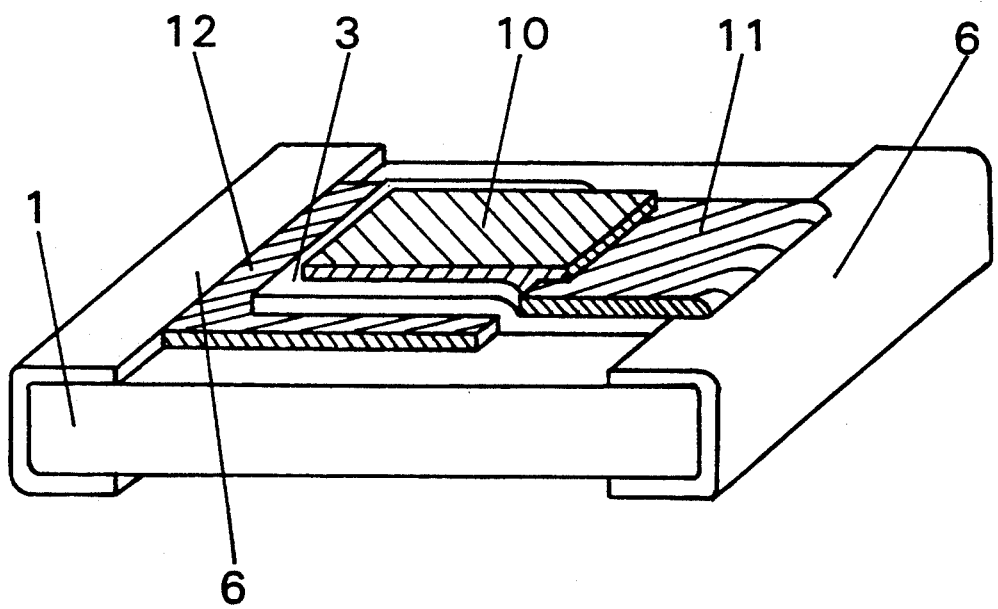
FIG. 6 is a perspective view showing a modified version of the embodiment.

Referring to FIG. 6, another aspect of the present invention will be described as Example (2):

Example (2)

The illustrated capacitor includes a dielectric layer 3, and an adjusting electrodes 10 and a metal electrode 11 with the dielectric layer 3 interlocated therebetween. There is provided another electrode 12 that is not directly in facing relationship with the metal electrode 11. In this example a protective layer can be used to cover the capacitor. The feature of this example resides in the fact that the electrodes 11 and 12 are arranged without mutual direct face-to-face relationship. The main advantage of this example is that an adjustable range of capacity is large. In Example (1) the minimum value of capacity is decided by the corresponding area of the metal electrode 5 and 2, and cannot be less than that.

In the capacitor shown in FIG. 6, if the whole adjusting electrode is eroded, the capacity can be extremely reduced so that the adjustable range is advantageously wide.

Each component can be made of the same materials as described above with respect to Example (1).

Figure 7:
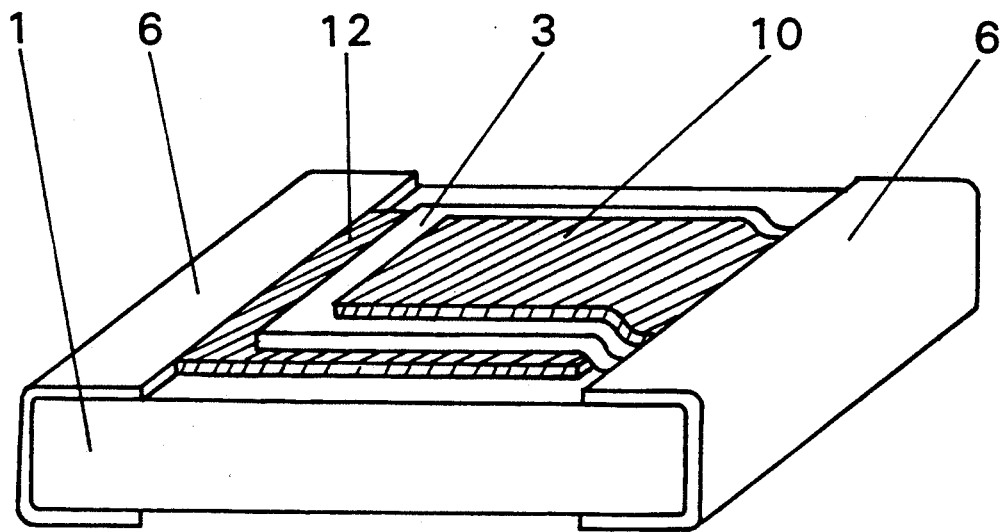
FIG. 7 is a perspective view showing another modified version of the embodiment.

FIG. 7 shows a modification to Example (2) in which the metal electrode 11 is not used. The protective layer can be used to protect the adjusting electrode 10. Because of the omission of the metal electrode 11, time is saved in the production process.

Figure 8:
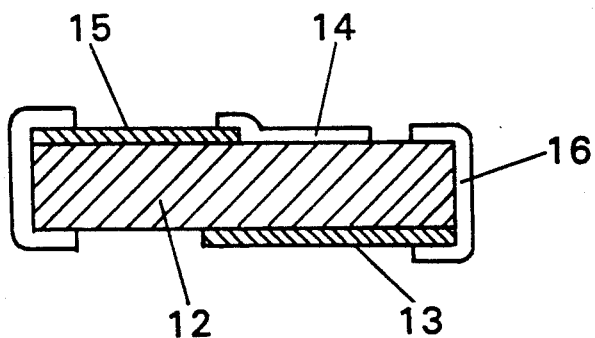
FIG. 8 is a sectional view showing a further modified version of the embodiment.

Referring to FIG. 8, the present invention will be described as Example (3):

Example (3)

The capacitor includes a dielectric block 12 and an electrode 13 joined to one side of the block 12 and an adjusting electrode 14 and a metal electrode 15 on the other side of the block 12. The reference numeral 16 denotes a lead extended from the dielectric block 12. The adjusting electrode 14 is eroded by exposure to light, thereby effecting the adjustment of capacity in a relatively wide range. By adjusting the relative areas of the electrode 13 and the metal electrode 15, the capacity of the capacitor can be variably adjusted. Example (3) of FIG. 8 does not require the insulating substrate 1, thereby reducing the production cost. The dielectric block 12 preferably has a smooth surface for accepting the adjusting electrode 14. The adjusting electrode 14 alone or the capacitor as a whole can be covered with a protective layer.

The dielectric block 12 is made of a dielectric substance in common use like dielectric ceramics such as sintered barium titanate. The electrode 13, the adjusting electrode 14, the metal electrode 15 and the terminal 16 are made of any of the substances referred to above.

Figure 9:
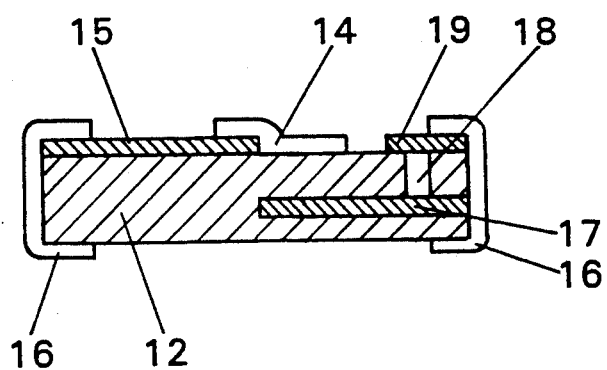
FIG. 9 is a cross-sectional view showing a modified version using a dielectric block.
Figure 10:
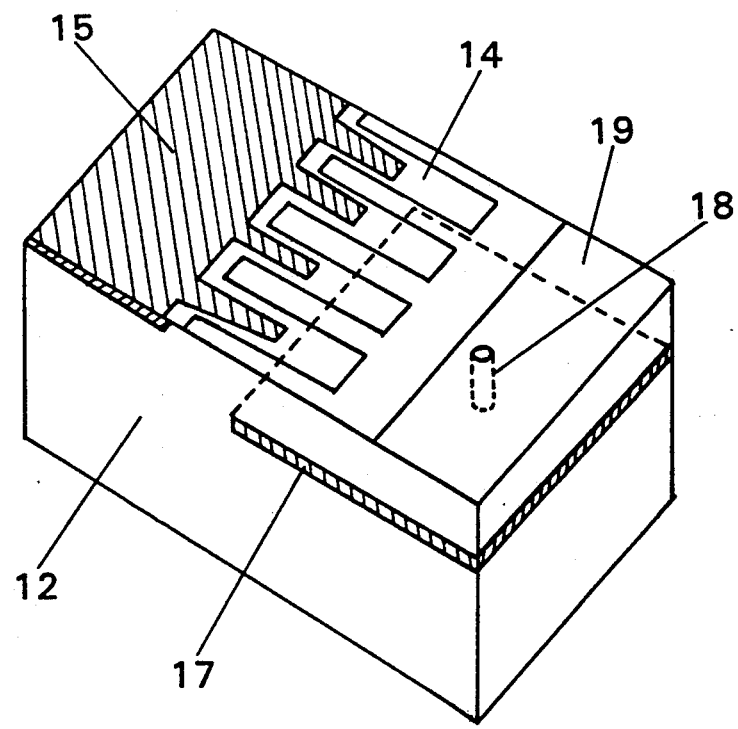
FIG. 10 is a perspective view showing a unified body of a metal electrode and a capacity adjusting electrode.

As shown in FIG. 9, in Example (3), if the distance between the electrodes is to be shortened and the capacity is to be increased, an internal electrode 17 can be provided inside the dielectric block 10. The internal electrode 17 is connected to the terminal 16 directly or through a through hole 18 and any upper electrode 19. The internal electrode 17 is made of a substance selected from tungsten, palladium, gold, silver, nickel and copper, depending on the kind of the dielectric block 10. The through hole 18 is internally coated with gold, silver, copper or any other conductive pigment by painting or plating. The main advantage of Example 3 is that the adjusting electrode 44 need not have a large cut area, and the trimming time is shortened.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A capacitor comprising a dielectric layer, a first electrode and a second electrode at opposite sides of the dielectric layer, the second electrode comprising a metal electrode and a capacitance adjusting electrode electrically connected to the metal electrode, and a protective layer covering at least the capacitance adjusting electrode, the capacitance adjusting electrode being removable by exposure to light energy without damaging the protective layer, the capacitance adjusting electrode being a thin film selected from at least one of metallic oxides and metallic boride.

2. A capacitor comprising a dielectric layer, a first electrode and a second electrode at opposite sides of the dielectric layer, the second electrode comprising a metal electrode and a capacitance adjusting electrode electrically connected to the metal electrode, and a protective layer covering at least the capacitance adjusting electrode, the capacitance adjusting electrode being removable by exposure to light energy without damaging the protective layer, the capacitance adjusting electrode being a thin film selected from at least one of metallic oxides and metallic boride, and wherein the metallic oxides are ruthenium oxide and its derivatives.

3. A capacitor comprising a substrate, a first electrode overlaid on the substrate and electrically connected to a first terminal, a dielectric layer formed on the first electrode, a second electrode overlaid on the dielectric layer, the second electrode comprising a metal electrode and a capacitance adjusting electrode electrically connected to the metal electrode, and a protective layer covering at least the capacitance adjusting electrode, the capacitance adjusting electrode being removable by exposure to light energy without damaging the protective layer, the capacitance adjusting electrode being a thin film selected from at least one of metallic oxides and metallic boride, and the metal electrode and the capacitance adjusting electrode each being directly electrically connected to a second terminal.

4. A capacitor according to claim 3, wherein the first electrode on the substrate is not in facing relationship with the metal electrode.

5. A capacitor comprising a substrate, a first electrode overlaid on the substrate, a dielectric layer formed on the first electrode, a second electrode overlaid on the dielectric layer, the second electrode comprising a metal electrode and a capacitance adjusting electrode electrically connected to the metal electrode, and a protective layer covering at least the capacitance adjusting electrode, the capacitance adjusting electrode being removable by exposure to light energy without damaging the protective layer, the capacitance adjusting electrode being a thin film selected from at least one of metallic oxides and metallic boride, and wherein the metallic oxides are ruthenium oxide and its derivatives.

6. A capacitor comprising a substrate, a first electrode overlaid on the substrate, a dielectric layer formed on the first electrode, a capacitance adjusting electrode overlaid on the dielectric layer, and a protective layer covering at least the capacitance adjusting electrode, the capacitance adjusting electrode being removable by exposure to light energy without damaging the protective layer, the capacitance adjusting electrode being a thin film selected from at least one of metallic oxides and metallic boride, and the protective layer comprising a material selected from at least one of a thermoplastic and a thermosetting resin.

7. A capacitor comprising a substrate, a first electrode overlaid on the substrate, a dielectric layer formed on the first electrode, a capacitance adjusting electrode overlaid on the dielectric layer, and a protective layer covering at least the capacitance adjusting electrode, the capacitance adjusting electrode being removable by exposure to light energy without damaging the protective layer, the capacitance adjusting electrode being a thin film selected from at least one of metallic oxides and metallic boride, and wherein the metallic oxides are ruthenium oxide and its derivatives.

8. A capacitor comprising a dielectric layer, a first electrode and a second electrode at opposite sides of the dielectric layer, the second electrode comprising a metal electrode not in facing relationship with the first electrode, a capacitance adjusting electrode electrically connected to the metal electrode and in facing relationship with the first electrode, and a protective layer covering at least the capacitance adjusting electrode, the capacitance adjusting electrode being removable by exposure to light energy without damaging the protective layer, the capacitance adjusting electrode being a film selected from at least one of metallic oxides, metallic nitride and metallic boride.

9. A capacitor comprising a dielectric layer, a first electrode and a second electrode at opposite sides of the dielectric layer, the second electrode comprising a metal electrode not in facing relationship with the first electrode, a capacitance adjusting electrode electrically connected to the metal electrode and in facing relationship with the first electrode, and a protective layer covering at least the capacitance adjusting electrode, the capacitance adjusting electrode being removable by exposure to light energy without damaging the protective layer, the capacitance adjusting electrode being a thin film selected from at least one of metallic oxides and metallic boride, and wherein the metallic oxides are ruthenium oxide and its derivatives.

* * * * *

UNITED STATES PATENT AND TRADEMARK OFFICE
CERTIFICATE OF CORRECTION

PATENT NO. : 5,159,524
DATED : October 27, 1992
INVENTOR(S) : Yo Hasegawa et al.

It is certified that error appears in the above-identified patent and that said Letters Patent is hereby corrected as shown below:

On the title page:

Col. 1, and Item (54): "TRIMABLE" should read-- TRIMMABLE --.

At Item [75] Inventor, after "Tatsuo Ogawa, Kobe" add --; Kanji Machida, Kyoto--.

In the Specification:

At column 5, line 32, "10" should read--12--.

At column 5, line 41, "44" should read --14--.

Signed and Sealed this

Thirtieth Day of November, 1993

Attest:

BRUCE LEHMAN

*Attesting Officer*    *Commissioner of Patents and Trademarks*